United States Patent
Lee

(10) Patent No.: US 12,095,835 B2
(45) Date of Patent: Sep. 17, 2024

(54) TERMINAL APPARATUS AND CLOUD STREAMING SERVICE METHOD

(71) Applicant: SK Planet Co., Ltd., Seongnam-si (KR)

(72) Inventor: Eung Ju Lee, Seoul (KR)

(73) Assignee: SK Planet Co., Ltd., Seongnam-si (KR)

( * ) Notice: Subject to any disclaimer, the term of this patent is extended or adjusted under 35 U.S.C. 154(b) by 6 days.

(21) Appl. No.: 18/340,042

(22) Filed: Jun. 23, 2023

(65) Prior Publication Data
US 2024/0163318 A1  May 16, 2024

(30) Foreign Application Priority Data
Nov. 14, 2022 (KR) .......................... 10-2022-0151464

(51) Int. Cl.
*H04L 65/402* (2022.01)
*H04L 67/025* (2022.01)

(52) U.S. Cl.
CPC .......... *H04L 65/402* (2022.05); *H04L 67/025* (2013.01)

(58) Field of Classification Search
CPC ............................. H04L 65/402; H04L 67/025
See application file for complete search history.

(56) References Cited

U.S. PATENT DOCUMENTS

| | | | |
|---|---|---|---|
| 2013/0113883 A1* | 5/2013 | Kanemaru | H04N 13/183 348/43 |
| 2016/0232871 A1* | 8/2016 | Zhao | G06F 3/14 |
| 2018/0146243 A1* | 5/2018 | Zeng | H04N 21/44004 |
| 2018/0261140 A1* | 9/2018 | Yi | G09G 3/2003 |
| 2021/0093966 A1* | 4/2021 | Cerny | H04N 21/8547 |
| 2022/0191580 A1* | 6/2022 | Yu | H04N 21/4854 |
| 2023/0154432 A1* | 5/2023 | Rastogi | G09G 5/14 345/699 |

OTHER PUBLICATIONS

"How to avoid flickering and black screen issues when using VideoView?"; Mateusz Klimek; https://brightinventions.pl/blog/frame-video-view/; Jan. 10, 2015 (Year: 2015).*

* cited by examiner

*Primary Examiner* — Mohamed A. Wasel
*Assistant Examiner* — Jihad K Boustany
(74) *Attorney, Agent, or Firm* — WTA Patents

(57) ABSTRACT

The present disclosure relates to a method for a smooth screen switch between image cloud streaming (ICS) of receiving a screen in an image mode and video cloud streaming (VCS) of receiving a screen in a video mode in a cloud streaming service.

7 Claims, 4 Drawing Sheets

TERMINAL APPARATUS AND CLOUD STREAMING SERVICE METHOD

CROSS-REFERENCE TO RELATED APPLICATION

This application claims priority under 35 U.S.C. § 119(a) to Republic of Korean Patent Application No. 10-2022-0151464, filed on Nov. 14, 2022, the disclosure of which is herein incorporated by reference in its entirety.

BACKGROUND OF THE INVENTION

1. Field of the Invention

The present disclosure relates to a method for a smooth screen switch between image cloud streaming (ICS) of receiving a screen by in image mode and video cloud streaming (VCS) of receiving a screen in a video mode in a cloud streaming service.

2. Description of the Prior Art

A rapid development of the Internet has resulted in a remarkable improvement in personal communication speed.

This improvement in communication speed provides an environment enabling use of a remote computer as if accessing a remote computer to download or upload mass data or locally logging onto a remote computer by using a remote computer control program.

In addition, as various applications executed in a mobile communication terminal, such as a smartphone, have been developed, a large number of virtualization technologies for executing an application requiring high performance in a user terminal with relatively low performance are being proposed.

Among the virtualization technologies, a screen virtualization-based cloud streaming service in which an application is executed in a server, an execution screen is compressed through video encoding and transmitted to a client, and the client plays a transmitted video to thereby have an effect as if the application were executed in a terminal of the client receives is receiving spotlight.

Cloud streaming services may be divided into image cloud streaming (ICS) of providing a screen in an image mode and video cloud streaming (VCS) of providing a screen in a video mode, and a switch between ICS and VCS is required depending on circumstances.

However, since ICS and VCS use different views and connect to different servers, a flicker may occur due to a black screen that is instantaneously exposed when switching between views in a switch process, and a disparate screen may be exposed due to a delay when switching a server.

SUMMARY OF THE INVENTION

The present disclosure has been made in order to solve the above-mentioned problems in the prior art, and an aspect of the present disclosure is to smoothly switch a screen when switching between image cloud streaming (ICS) of receiving a screen in an image mode and video cloud streaming (VCS) of receiving a screen in a video mode in a cloud streaming service.

To achieve the foregoing aspect, a terminal apparatus according to an embodiment of the present disclosure includes: an identification unit configured to identify a request for a switch between image cloud streaming (ICS) of receiving a screen in an image mode and video cloud streaming (VCS) of receiving a screen in a video mode in a cloud streaming service; and a processing unit configured to process the switch between the ICS and the VCS by using an overlay structure formed between a screen of the ICS and a screen of the VCS according to the request for the switch.

Specifically, the processing unit may be configured to use an overlay structure in which the screen of the ICS is configured as a background of a SurfaceView used in the VCS when the cloud streaming service is used through an Android native UI.

Specifically, the processing unit may be configured to switch the SurfaceView to a visible state in a state of configuring the screen of the ICS as the background of the SurfaceView when a request for a switch from the ICS to the VCS is identified, and expose the screen of the VCS by processing the background of the SurfaceView to be transparent when the SurfaceView is completely switched to the visible state.

Specifically, the processing unit may be configured to switch a TextureView used in the ICS to an invisible state before switching the SurfaceView to the visible state, and terminate a connection to an ICS server from which the screen of the ICS is received.

Specifically, the processing unit may be configured to obtain the screen of the ICS from an ICS server to configure the screen of the ICS as the background of the SurfaceView in a state of receiving the screen of the VCS when a request for a switch from the VCS to the ICS is identified, and switch the SurfaceView to an invisible state and terminate a connection to a VCS server, from which the screen of the VCS is received, to expose the screen of the ICS when the background of the SurfaceView is completely configured.

Specifically, the processing unit may be configured to use an overlay structure in which the screen of the ICS is disposed on the screen of the VCS when using the cloud streaming service through a web browser.

Specifically, the processing unit may be configured to obtain the screen of the VCS from a VCS server in a state of exposing the screen of the ICS in a pause state when a request for a switch from the ICS to the VCS is identified, and expose the screen of the VCS by processing the screen of the ICS to be transparent when the screen of the VCS is completely obtained.

Specifically, the processing unit may be configured to obtain the screen of the ICS from an ICS server in a state of receiving the screen of the VCS when a request for a switch from the VCS to the ICS is identified, and terminate a connection to a VCS server, from which the screen of the VCS is received, when the screen of the ICS is completely obtained.

To achieve the foregoing aspect, a cloud streaming service method performed by a terminal apparatus according to an embodiment of the present disclosure includes: identifying a request for a switch between image cloud streaming (ICS) of receiving a screen in an image mode and video cloud streaming (VCS) of receiving a screen in a video mode in a cloud streaming service; and processing the switch between the ICS and the VCS by using an overlay structure formed between a screen of the ICS and a screen of the VCS according to the request for the switch.

Specifically, the processing may use an overlay structure in which the screen of the ICS is configured as a background of a SurfaceView used in the VCS when the cloud streaming service is used through an Android native UI.

Specifically, the processing may include switching the SurfaceView to a visible state in a state of configuring the screen of the ICS as the background of the SurfaceView when a request for a switch from the ICS to the VCS is identified, and exposing the screen of the VCS by processing the background of the SurfaceView to be transparent when the SurfaceView is completely switched to the visible state.

Specifically, the processing may include switching a TextureView used in the ICS to an invisible state before switching the SurfaceView to the visible state, and terminating a connection to an ICS server from which the screen of the ICS is received.

Specifically, the processing may include obtaining the screen of the ICS from an ICS server to configure the screen of the ICS as the background of the SurfaceView in a state of receiving the screen of the VCS when a request for a switch from the VCS to the ICS is identified, and switching the SurfaceView to an invisible state and terminating a connection to a VCS server, from which the screen of the VCS is received, to expose the screen of the ICS when the background of the SurfaceView is completely configured.

Specifically, the processing may use an overlay structure in which the screen of the ICS is disposed on the screen of the VCS when using the cloud streaming service through a web browser.

Specifically, the processing may include obtaining the screen of the VCS from a VCS server in a state of exposing the screen of the ICS in a pause state when a request for a switch from the ICS to the VCS is identified, and exposing the screen of the VCS by processing the screen of the ICS to be transparent when the screen of the VCS is completely obtained.

Specifically, the processing may include obtaining the screen of the ICS from an ICS server in a state of receiving the screen of the VCS when a request for a switch from the VCS to the ICS is identified, and terminating a connection to a VCS server, from which the screen of the VCS is received, when the screen of the ICS is completely obtained.

A terminal apparatus and a cloud streaming service method according to the present disclosure enable a screen switch by using an overlay structure of an ICS screen and a VCS screen when switching between ICS of receiving a screen in an image mode and VCS of receiving a screen in a video mode, thereby adaptively achieving a smooth screen switch even in a view switch and a change of a connection server.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
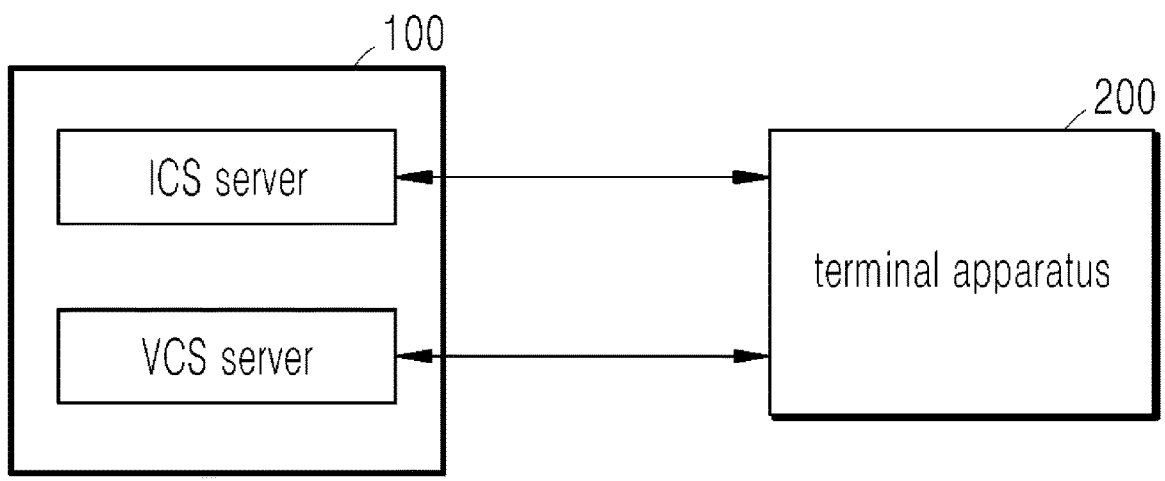
FIG. 1 illustrates a cloud streaming service environment according to an embodiment of the present disclosure.

It should be noted that the technical terms used in the present disclosure are only used to describe specific embodiments, and are not intended to limit the technical idea of the present disclosure.

In addition, unless defined otherwise in the present disclosure, the technical terms as used herein should be interpreted to have the same meaning as those commonly understood by a person skilled in the art to which the present disclosure pertains, and are not to be interpreted to have excessively comprehensive or excessively reduced meanings.

Furthermore, when the technical terms as used herein are erroneous technical terms that fail to accurately express the technical idea of the present disclosure, they should be interpreted as alternative technical terms that can be correctly understood by a person skilled in the art. Furthermore, general terms as used herein should be interpreted to have the meanings defined in dictionaries or the contextual meanings in the relevant field of art, and are not to be interpreted to have excessively reduced meanings.

Hereinafter, exemplary embodiments according to the present disclosure will be described in detail with reference to the accompanying drawings. Regardless of reference signs, the same or like elements are provided with the same or like reference signs in the drawings, and repetitive descriptions thereof will be omitted.

Furthermore, in describing the technology of the present disclosure, a detailed description of known functions or configurations incorporated herein will be omitted when it is determined that the description may make the subject matter of the disclosure unclear.

Furthermore, it should be noted that the accompanying drawings are merely for the purpose of easy understanding of the technical idea of the present disclosure, and are not to be interpreted to limit the technical idea.

Hereinafter, exemplary embodiments of the present disclosure will be described with reference to the accompanying drawings.

An embodiment of the present disclosure discloses a technique relating to a cloud streaming service.

A rapid development of the Internet has resulted in a remarkable improvement in personal communication speed, and this improvement in communication speed provides an environment enabling use of a remote computer as if accessing a remote computer to download or upload mass data or locally logging onto a remote computer by using a remote computer control program.

In addition, as various applications executed in a mobile communication terminal, such as a smartphone, have been developed, a large number of virtualization technologies for executing an application requiring high performance in a user terminal with relatively low performance are being proposed.

Among the virtualization technologies, a screen virtualization-based cloud streaming service in which an application is executed in a server, an execution screen is compressed through video encoding and transmitted to a client, and the client plays a transmitted video to thereby have an effect as if the application were executed in a terminal of the client receives is receiving spotlight.

Cloud streaming services may be divided into image cloud streaming (ICS) of providing a screen in an image mode and video cloud streaming (VCS) of providing a screen in a video mode, and a switch between ICS and VCS is required depending on circumstances.

However, since ICS and VCS use different views and connect to different servers, a flicker may occur due to a black screen that is instantaneously exposed when switching between views in a switch process, and a disparate screen may be exposed due to a delay when switching a server.

Therefore, an embodiment of the present disclosure proposes a new method for realizing a smooth screen switch between ICS and VCS in a cloud streaming service.

FIG. 1 illustratively shows a cloud streaming service environment according to an embodiment of the present disclosure.

As shown in FIG. 1, the cloud streaming service environment according to the embodiment of the present disclosure may have a configuration including a cloud streaming server 100 and a terminal apparatus 200.

The cloud streaming server 100 may include an image cloud streaming (ICS) server that receives a screen in an image mode and a video cloud streaming (VCS) server that provides a screen in a video mode.

The terminal apparatus 200 may include a device (e.g., a smartphone) that uses a cloud streaming service through an Android native UI and a device (e.g., a web set-top box) that uses a cloud streaming service through a web browser.

When using a cloud streaming service through the Android native UI, the terminal apparatus 200 uses a TextureView for ICS, and uses SurfaceView, which is different from that for ICS, for VCS.

The cloud streaming service environment according to the embodiment of the present disclosure enables a smooth screen switch between ICS and VCS, based on the foregoing configuration. Hereinafter, a configuration of the terminal apparatus 200 for realizing the smooth screen switch will be described in detail.

Figure 2:
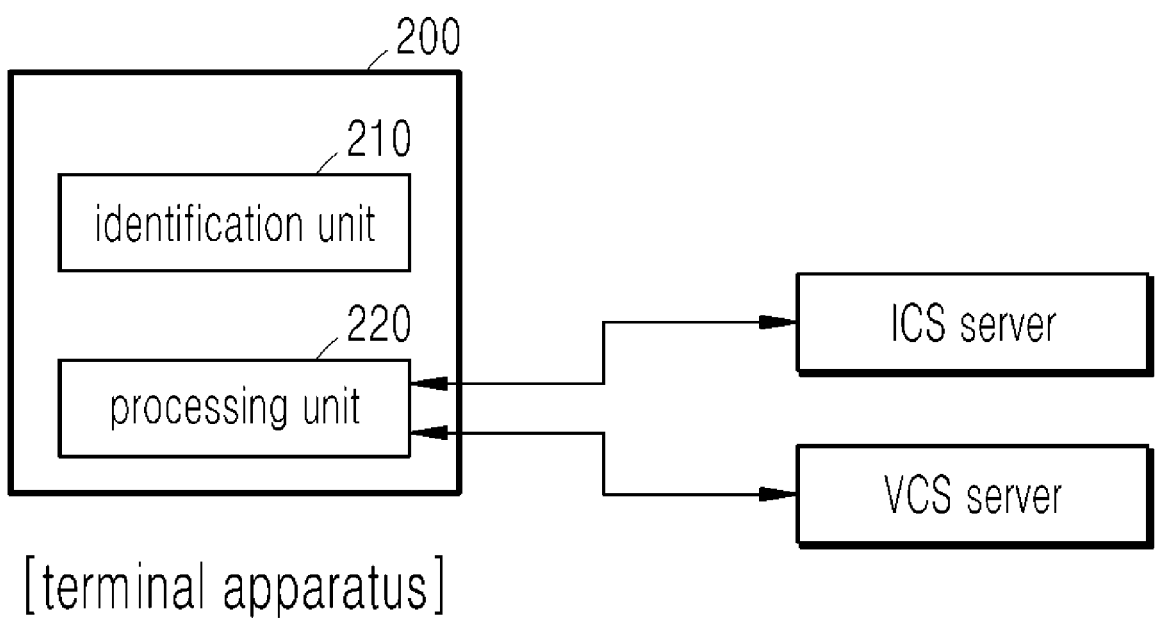
FIG. 2 illustrates a configuration of a terminal apparatus according to an embodiment of the present disclosure.

FIG. 2 schematically shows a configuration of a terminal apparatus 200 according to an embodiment of the present disclosure.

As shown in FIG. 2, the terminal apparatus 200 according to the embodiment of the present disclosure may have a configuration including an identification unit 210 and a processing unit 220.

All or at least part of the configuration of the terminal apparatus 200 may be configured in a form of a hardware module or a software module, or may be configured in a combination of a hardware module and a software module.

Here, a software module may be understood, for example, as an instruction executed by a processor that controls an operation within the terminal apparatus 200, and the instruction may have a form loaded in a memory within the terminal apparatus 200.

The terminal apparatus 200 according to the embodiment of the present disclosure may perform a smooth screen switch between image cloud streaming (ICS) and video cloud streaming (VCS) through the foregoing configuration. Hereinafter, each component of the terminal apparatus 200 for realizing the smooth screen switch will be described in detail.

The identification unit 210 functions to identify a request for a switch between ICS and VCS.

Specifically, the identification unit 210 identifies a request for a switch between ICS of receiving a screen in an image mode and VCS of receiving a screen in a video mode with respect to a cloud streaming service.

Here, the identification unit 210 may identify the request for the switch according to a user input while using the cloud streaming service through an Android native UI.

An environment for using the cloud streaming service through the Android native UI takes a configuration of the terminal apparatus 200 loaded with Android as an autonomous OS, for example, a smartphone, into consideration.

The identification unit 210 may identify the request for the switch according to the user input not only in the environment for using the cloud streaming service through the Android native UI but also in an environment for using the cloud streaming service through a web browser.

Here, the environment for using the cloud streaming service through the web browser takes a configuration of the terminal apparatus 200 capable of driving the web browser, for example, a web set-top box, into consideration.

The processing unit 220 functions to process a switch between ICS and CS.

Specifically, the processing unit 220 processes a switch between ICS and VCS by using an overlay structure formed between an ICS screen and a VCS screen according to a request for a switch between ICS and VCS.

Here, a method for processing the switch between ICS and VCS may vary according to a service environment in which the request for the switch between ICS and VCS is identified.

In the environment for using the cloud streaming service through the Android native UI, the processing unit 220 may process the switch between ICS and VCS by using the overlay structure in which an ICS screen is configured as a background of a SurfaceView used in VCS.

A switch processing operation using this overlay structure is described in detail as follows.

That is, in the environment for using the cloud streaming service through the Android native UI, when a request to switch from ICS to VCS is identified, the processing unit 220 switches a TextureView used in ICS to an invisible state in a state of configuring an ICS screen as a background of a SurfaceView, and terminates a connection to an ICS server in which the ICS screen is received.

When the connection to the ICS server is terminated, the processing unit 220 switches the SurfaceView to a visible state, and exposes a VCS screen by processing the background of the SurfaceView to be transparent when the SurfaceView is completely switched to the visible state, thereby completing the switch from ICS to VCS.

Here, the processor 220 connects to a VCS server to switch the SurfaceView to the visible state, does not perform decoder rendering, and starts decoder rendering and configures the background of the SurfaceView to transparent when a SurfaceView screen is ready.

In general, when the SurfaceView is switched to the visible state, automatic creation of the SurfaceView is started to use a media codec, in which case it takes a certain time to completely create the SurfaceView according to a terminal specification, and a flicker may occur due to a black screen exposed by the SurfaceView during the time.

Therefore, in an embodiment of the present disclosure, the ICS screen may be configured as the background of the SurfaceView and the ICS screen configured as the background may be exposed until the SurfaceView is switched to the visible state, thereby resolving the above problem of exposing the black screen during the switch between ICS and VCS.

In an embodiment of the present disclosure, a case in which a request to switch from VCS to ICS is identified in the foregoing environment for using the cloud streaming service through the Android native UI is further taken into consideration.

When the request to switch from VCS to ICS is identified, the processing unit 220 obtains an ICS screen from the ICS server to configure the ICS screen as a background of a SurfaceView in a state of receiving a VCS screen, switches the SurfaceView to an invisible state when the SurfaceView is completely configured, and terminates a connection to the VCS server, in which the VCS screen is received, to expose the ICS screen, thereby completing the switch from VCS to ICS.

In general, when the switch from VCS to ICS is performed, the SurfaceView needs to be switched to the invisible state and the ICS screen needs to be exposed. Here, when exposure timing is not appropriate, a flicker may occur due to a black screen exposed by the SurfaceView.

Therefore, in an embodiment of the present disclosure, the state of receiving the VCS screen may be maintained until the ICS screen is newly obtained and the background of the SurfaceView is completely configured, thereby resolving the above problem of exposing the black screen during the switch between ICS and VCS.

The switch in the environment for using the cloud streaming service through the Android native UI has been described above, and the environment for using the cloud streaming service through the web browser is described.

In the environment for using the cloud streaming service through the web browser, the processing unit 220 may process a switch between ICS and VCS by using an overlay structure in which an ICS screen is disposed on a VCS screen.

A switch processing operation using this overlay structure is described in detail as follows.

That is, in the environment for using the cloud streaming service through the web browser, when a request to switch from ICS to VCS is identified, the processing unit 220 obtains a VCS screen from the VCS server in a state of exposing an ICS screen in a pause state, and exposes the VCS screen by processing the ICS screen to be transparent when the VCS screen is completely obtained, thereby completing the switch from ICS to VCS.

In general, when the switch from ICS to VCS is performed in the environment for using the cloud streaming service through the browser (web browser), a disparate screen may be exposed due to a delay when switching the server.

Therefore, in an embodiment of the present disclosure, the ICS screen disposed on the VCS screen may be maintained to be exposed until the VCS screen is ready, thereby resolving the above problem of exposing the disparate screen due to the delay when switching the server.

In an embodiment of the present disclosure, a case in which a request to switch from VCS to ICS is identified in the foregoing environment for using the cloud streaming service through the web browser is further taken into consideration.

When the request to switch from VCS to ICS is identified, the processing unit 220 obtains an ICS screen from the ICS server in a state of receiving a VCS screen, and terminates a connection to the VCS server, in which the VCS screen is received, when the ICS screen is completely obtained, thereby completing the switch from VCS to ICS.

In an embodiment of the present disclosure, when switching from VCS to ICS, the VCS screen may be maintained to be exposed until the ICS screen disposed on the VCS screen is ready, thereby resolving the above problem of exposing the disparate screen due to the delay when switching the server.

As described above, the configuration of the terminal apparatus 200 according to an embodiment of the present disclosure enables a screen switch by using an overlay structure of an ICS screen and a VCS screen when switching between ICS of receiving a screen in an image mode and VCS of receiving a screen in a video mode, thereby adaptively achieving a smooth screen switch even in a view switch and a change of a connection server.

Hereinafter, a cloud streaming service method according to an embodiment of the present disclosure will be described.

For convenience of explanation, in the following description, the terminal apparatus 200 described with reference to FIG. 2 will be referred to as an entity to perform the cloud streaming service method, and an environment for using a cloud streaming service through an Android native UI and an environment for using a cloud streaming service through a web browser will be separately described.

Figure 3:
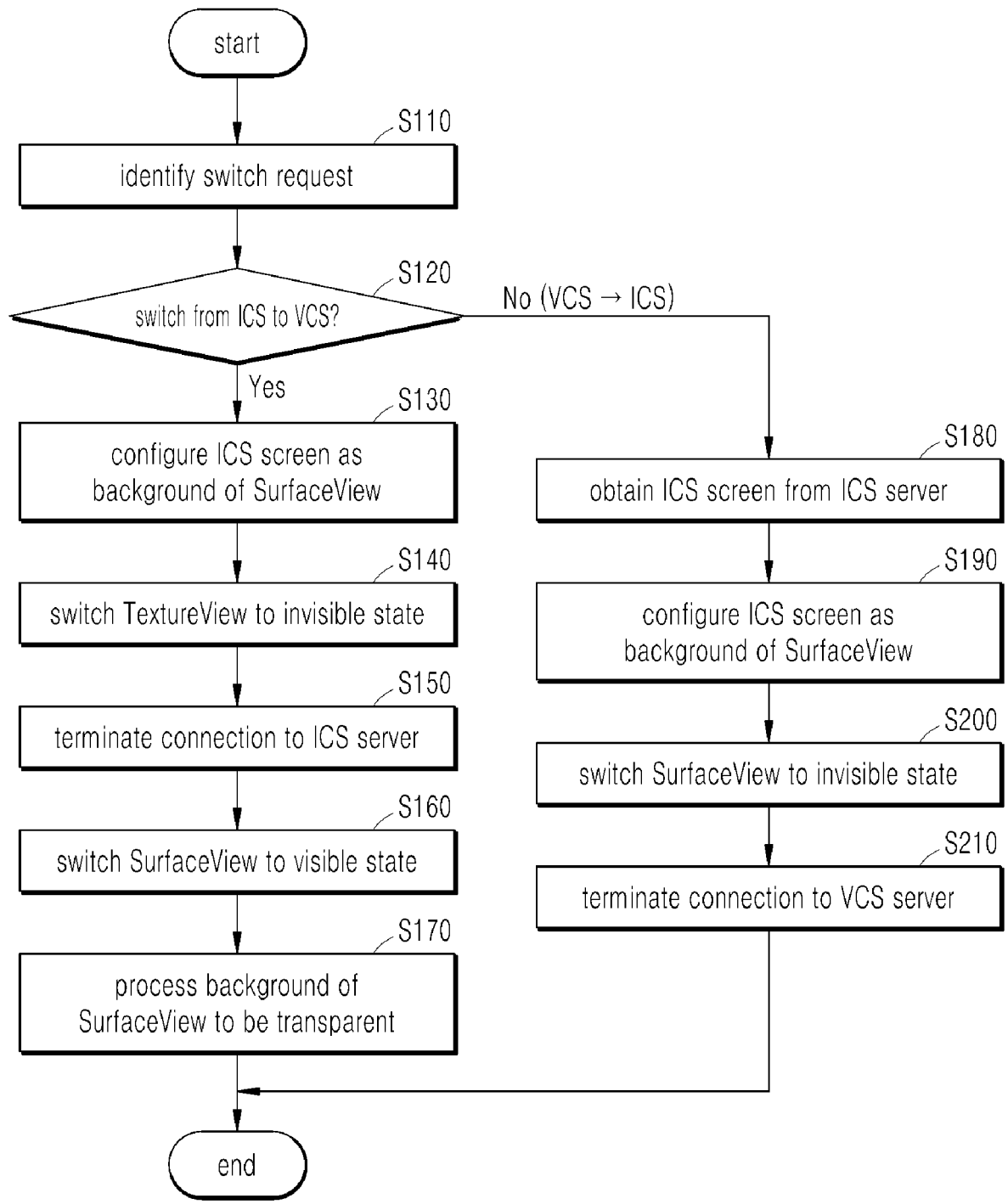
FIG. 3 and FIG. 4 are flowcharts illustrating a cloud streaming service method according to an embodiment of the present disclosure.

First, an operation in the environment for using the cloud streaming service through the Android native UI is described with reference to FIG. 3 as follows.

The terminal apparatus 200 identifies a switch request according to a user input while using a cloud streaming service through the Android native UI (S110).

Here, the environment for using the cloud streaming service through the Android native UI takes a configuration of the terminal apparatus 200 loaded with Android as an autonomous OS, for example, a smartphone, into consideration.

When a request for a switch from ICS to VCS is identified, the terminal apparatus 200 switches a TextureView used in ICS to an invisible state in a state of configuring an ICS screen as a background of a SurfaceView, and terminates a connection to an ICS server in which the ICS screen is received (S120 to S150).

When the connection to the ICS server is terminated, the terminal apparatus 200 switches the SurfaceView to a visible state, and exposes a VCS screen by processing the background of the SurfaceView to be transparent when the SurfaceView is completely switched to the visible state, thereby completing the switch from ICS to VCS (S150 to S170).

Here, the terminal apparatus 200 connects to a VCS server to switch the SurfaceView to the visible state, does not perform decoder rendering, and starts decoder rendering and configures the background of the SurfaceView to transparent when a SurfaceView screen is ready.

In general, when the SurfaceView is switched to the visible state, automatic creation of the SurfaceView is started to use a media codec, in which case it takes a certain time to completely create the SurfaceView according to a terminal specification, and a flicker may occur due to a black screen exposed by the SurfaceView during the time.

Therefore, in an embodiment of the present disclosure, the ICS screen may be configured as the background of the SurfaceView and the ICS screen configured as the background may be exposed until the SurfaceView is switched to the visible state, thereby resolving the above problem of exposing the black screen during the switch between ICS and VCS.

When a request for a switch from VCS to ICS is identified in S120, the terminal apparatus 200 obtains an ICS screen from the ICS server to configure the ICS screen as a background of a SurfaceView in a state of receiving a VCS screen (S180 and S190).

Subsequently, when the SurfaceView is completely configured, the terminal apparatus 200 switches the SurfaceView to an invisible state, and terminates a connection to the VCS server, in which the VCS screen is received, to expose the ICS screen, thereby completing the switch from VCS to ICS (S200 and S210).

In general, when the switch from VCS to ICS is performed, the SurfaceView needs to be switched to the invisible state and the ICS screen needs to be exposed. Here, when exposure timing is not appropriate, a flicker may occur due to a black screen exposed by the SurfaceView.

Therefore, in an embodiment of the present disclosure, the state of receiving the VCS screen may be maintained until the ICS screen is newly obtained and the background of the SurfaceView is completely configured, thereby resolving the above problem of exposing the black screen during the switch between ICS and VCS.

Figure 4:
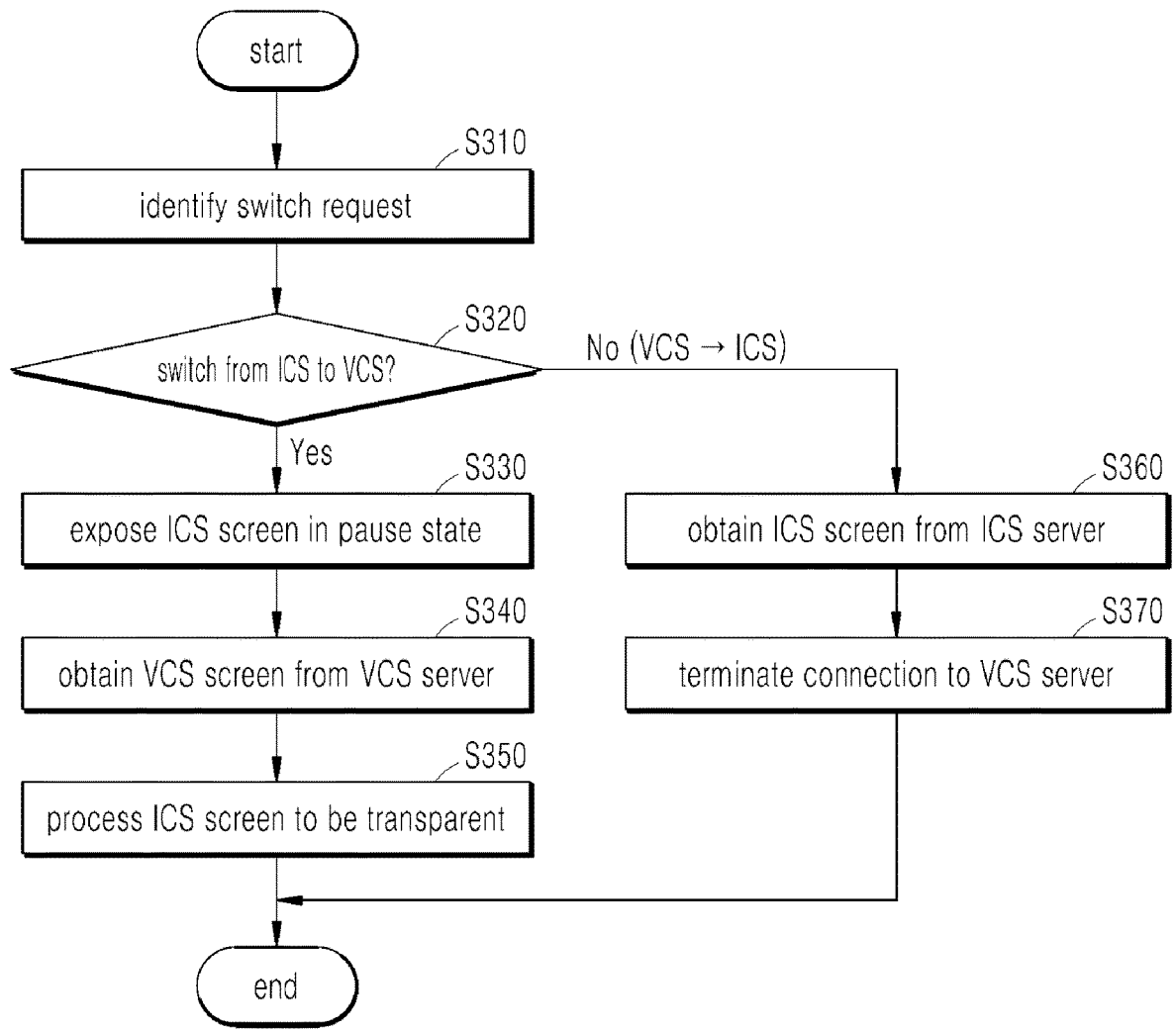

Next, an operation in the environment for using the cloud streaming service through the web browser is described with reference to FIG. 4 as follows.

The terminal apparatus 200 identifies a switch request according to a user input in the environment for using the cloud streaming service through the web browser (S310).

Here, the environment for using the cloud streaming service through the web browser takes a configuration of the terminal apparatus 200 capable of driving the web browser, for example, a web set-top box, into consideration.

When a request for a switch from ICS to VCS is identified, the terminal apparatus 200 obtains a VCS screen from the VCS server in a state of exposing an ICS screen in a pause state (S320 to S340).

When the VCS screen is completely obtained, the terminal apparatus 200 exposes the VCS screen by processing the ICS screen to be transparent, thereby completing the switch from ICS to VCS (S350).

In general, when the switch from ICS to VCS is performed in the environment for using the cloud streaming service through the browser (web browser), a disparate screen may be exposed due to a delay when switching the server.

Therefore, in an embodiment of the present disclosure, the ICS screen disposed on the VCS screen may be maintained to be exposed until the VCS screen is ready, thereby resolving the above problem of exposing the disparate screen due to the delay when switching the server.

When a request for a switch from VCS to ICS is identified in S320, the terminal apparatus 200 obtains an ICS screen from the ICS server in a state of receiving a VCS screen (S360).

Subsequently, when the ICS screen is completely obtained, the terminal apparatus 200 terminates a connection to the VCS server, in which the VCS screen is received, thereby completing the switch from VCS to ICS (S370).

In an embodiment of the present disclosure, when switching from VCS to ICS, the VCS screen may be maintained to be exposed until the ICS screen disposed on the VCS screen is ready, thereby resolving the above problem of exposing the disparate screen due to the delay when switching the server.

As described above, a cloud streaming service method according to an embodiment of the present disclosure enables a screen switch by using an overlay structure of an ICS screen and a VCS screen when switching between ICS of receiving a screen in an image mode and VCS of receiving a screen in a video mode, thereby adaptively achieving a smooth screen switch even in a view switch and a change of a connection server.

The implementations of the functional operations and subject matter described in the present disclosure may be realized by a digital electronic circuit, by the structure described in the present disclosure, and the equivalent including computer software, firmware, or hardware including, or by a combination of one or more thereof. Implementations of the subject matter described in the specification may be implemented in one or more computer program products, that is, one or more modules related to a computer program command encoded on a tangible program storage medium to control an operation of a processing system or the execution by the operation.

A computer-readable medium may be a machine-readable storage device, a machine-readable storage substrate, a memory device, or a combination of one or more thereof.

In the specification, the term "system" or "device", for example, covers a programmable processor, a computer, or all kinds of mechanisms, devices, and machines for data processing, including a multiprocessor and a computer. The processing system may include, in addition to hardware, a code that creates an execution environment for a computer program when requested, such as a code that constitutes processor firmware, a protocol stack, a database management system, an operating system, or a combination of one or more thereof.

A computer program (also known as a program, software, software application, script, or code) may be written in any form of programming language, including compiled or interpreted languages, declarative or procedural languages, and it may be deployed in any form, including as a stand-alone program or module, a component, subroutine, or another unit suitable for use in a computer environment. A computer program may, but need not, correspond to a file in a file system. A program may be stored in a single file provided to the requested program, in multiple coordinated files (for example, files that store one or more modules, sub-programs, or portions of code), or in a portion of a file that holds other programs or data (for example, one or more scripts stored in a markup language document). A computer program may be deployed to be executed on one computer or on multiple computers that are located at one site or distributed across a plurality of sites and interconnected by a communication network.

A computer-readable medium suitable for storing a computer program command and data includes all types of non-volatile memories, media, and memory devices, for example, a semiconductor memory device such as an EPROM, an EEPROM, and a flash memory device, and a magnetic disk such as an external hard disk or an external disk, a magneto-optical disk, a CD-ROM, and a DVD-ROM disk. A processor and a memory may be added by a special purpose logic circuit or integrated into the logic circuit.

The implementations of the subject matter described in the specification may be implemented in a calculation system including a back-end component such as a data server, a middleware component such as an application server, a front-end component such as a client computer having a web browser or a graphic user interface which can interact with the implementations of the subject matter described in the specification by the user, or all combinations of one or more of the back-end, middleware, and front-end components. The components of the system can be mutually connected by any type of digital data communication such as a communication network or a medium.

While the specification contains many specific implementation details, these should not be construed as limitations to the scope of any disclosure or of what may be claimed, but rather as descriptions of features that may be specific to particular embodiments of particular disclosures. Certain features that are described in the specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

In addition, in the specification, the operations are illustrated in a specific sequence in the drawings, but it should be understood that the operations are not necessarily performed in the shown specific sequence or that all shown operations are necessarily performed in order to obtain a preferable result. In a specific case, multitasking and parallel processing may be preferable. Furthermore, it should not be understood that a separation of the various system components of the above-mentioned implementation is required in all implementations. In addition, it should be understood that the described program components and systems usually may be integrated in a single software package or may be packaged in a multi-software product.

As described above, specific terms disclosed in the specification do not intend to limit the present disclosure. Therefore, while the present disclosure was described in detail with reference to the above-mentioned examples, those skilled in the art may modify, change, and transform some parts without departing a scope of the present disclosure. The scope of the present disclosure is defined by the appended claims as described below, rather than the above detailed description. Accordingly, it should be understood that all modifications or variations derived from the meaning and scope of the appended claims and equivalents thereof fall within the scope of the present disclosure.

What is claimed is:

1. A terminal apparatus comprising:
   one or more processors; and
   a memory storing instruction thereon, the instructions when executed by the one or more processors cause the one or more processors to:
     identify a request for a switch between image cloud streaming (ICS) of receiving a screen in an image mode and video cloud streaming (VCS) of receiving a screen in a video mode in a cloud streaming service;
     process the switch between the ICS and the VCS by using an overlay structure formed between a screen of the ICS and a screen of the VCS according to the request for the switch,
   wherein the overlay structure uses the screen of the ICS as a background of a view of the VCS;
   wherein the view is switched to a visible state with the screen of the ICS set as the background of the view, responsive to identifying the request to switch from the ICS to the VCS; and
   wherein the background of the view is rendered transparent to expose the screen of the VCS, responsive to the view being switched to the visible state.

2. The terminal apparatus of claim 1, wherein the instructions cause the one or more processor to switch a TextureView used in the ICS to an invisible state before switching the view to the visible state, and terminate a connection to an ICS server for receiving the screen of the ICS.

3. The terminal apparatus of claim 1, wherein the instructions cause the one or more processors to:
   obtain the screen of the ICS from an ICS server to set the screen of the ICS as the background of the view during reception of the screen of the VCS, responsive to identifying a request for a switch from the VCS to the ICS; and
   switch the view to an invisible state and terminate a connection to a VCS server for receiving the screen of the VCS to expose the screen of the ICS, responsive to setting the background of the view.

4. A cloud streaming service method comprising:
   identifying a request for a switch between image cloud streaming (ICS) of a screen in an image mode and video cloud streaming (VCS) of a screen in a video mode in a cloud streaming service;
   processing the switch between the ICS and the VCS by using an overlay structure formed between a screen of the ICS and a screen of the VCS according to the request for the switch, the overlay structure using the screen of the ICS as a background of a view of the VCS;
   switching the view to a visible state with the screen of the ICS set as the background of the view, responsive to identifying the request to switch from the ICS to the VCS; and
   rendering the background of the view transparent to expose the screen of the VCS, responsive to the view being switched to the visible state.

5. The cloud streaming service method of claim 4, wherein the processing comprises:
   switching a TextureView used in the ICS to an invisible state before switching the view to the visible state, and terminating a connection to an ICS server for receiving the screen of the ICS.

6. The cloud streaming service method of claim 4, wherein the processing comprises:
   obtaining the screen of the ICS from an ICS server to set the screen of the ICS as the background of the view during reception of the screen of the VCS, responsive to identifying a request for a switch from the VCS to the ICS; and
   switching the view to an invisible state and terminate a connection to a VCS server for receiving the screen of the VCS to expose the screen of the ICS, responsive to setting the background of the view.

7. A non-transitory computer-readable recording medium storing instructions thereon, the instructions when executed by one or more processors cause the processor to:
   identify a request for a switch between image cloud streaming (ICS) of receiving a screen in an image mode and video cloud streaming (VCS) of receiving a screen in a video mode in a cloud streaming service;
   process the switch between the ICS and the VCS by using an overlay structure formed between a screen of the ICS and a screen of the VCS according to the request for the switch, the overlay structure using the screen of the ICS as a background of a view of the VCS;
   switch the view to a visible state with the screen of the ICS set as the background of the view, responsive to identifying the request to switch from the ICS to the VCS; and
   render the background of the view transparent to expose the screen of the VCS, responsive to the view being switched to the visible state.

* * * * *